(12) United States Patent
Kennedy

(10) Patent No.: US 10,883,646 B2
(45) Date of Patent: Jan. 5, 2021

(54) PIPE FOR PIPELINE INFRASTRUCTURES

(71) Applicant: Tracey Kennedy, Merrillville, IN (US)

(72) Inventor: Tracey Kennedy, Merrillville, IN (US)

( * ) Notice: Subject to any disclaimer, the term of this patent is extended or adjusted under 35 U.S.C. 154(b) by 75 days.

(21) Appl. No.: 15/910,441

(22) Filed: Mar. 2, 2018

(65) Prior Publication Data

US 2019/0271430 A1  Sep. 5, 2019

(51) Int. Cl.
| F15D 1/02 | (2006.01) |
| F16L 58/08 | (2006.01) |
| F17D 3/16 | (2006.01) |
| B05B 13/06 | (2006.01) |

(52) U.S. Cl.
CPC .............. F16L 58/08 (2013.01); B05B 13/06 (2013.01); F17D 3/16 (2013.01)

(58) Field of Classification Search
CPC .............. F16L 58/08; B05B 13/06; F17D 3/16
USPC .......................................... 138/39, 145, 146
See application file for complete search history.

(56) References Cited

U.S. PATENT DOCUMENTS

| 1,652,703 | A | * | 12/1927 | Cushman | ................ | E01F 5/005 |
| | | | | | | 285/55 |
| 3,149,646 | A | * | 9/1964 | Xenis | .................... | F16L 21/022 |
| | | | | | | 138/97 |
| 3,474,832 | A | * | 10/1969 | Broadhead | ............ | F16L 55/163 |
| | | | | | | 138/97 |
| 3,934,614 | A | * | 1/1976 | Elek | ........................ | E02B 8/06 |
| | | | | | | 138/44 |
| 3,990,860 | A | * | 11/1976 | Fletcher | .................... | B22F 1/02 |
| | | | | | | 428/404 |
| 4,254,165 | A | * | 3/1981 | Phelps | ..................... | B05D 7/22 |
| | | | | | | 138/137 |
| 4,257,459 | A | * | 3/1981 | Jenks | ...................... | F16L 58/08 |
| | | | | | | 138/147 |
| 4,621,953 | A | * | 11/1986 | McGuth | .................. | F16L 57/06 |
| | | | | | | 138/39 |
| 6,042,263 | A | * | 3/2000 | Mentzer | .................. | B01F 5/061 |
| | | | | | | 138/44 |
| 7,320,341 | B2 | * | 1/2008 | Brandys | .................. | F16L 57/06 |
| | | | | | | 138/141 |
| 2002/0104573 | A1 | * | 8/2002 | Raftis | ..................... | E03F 5/102 |
| | | | | | | 138/41 |
| 2007/0207186 | A1 | * | 9/2007 | Scanlon | .................... | A61F 2/07 |
| | | | | | | 424/424 |
| 2007/0246113 | A1 | * | 10/2007 | Raftis | ..................... | E03F 5/102 |
| | | | | | | 138/41 |
| 2017/0074448 | A1 | * | 3/2017 | Maimets | .............. | F16L 55/163 |

\* cited by examiner

*Primary Examiner* — James F Hook
(74) *Attorney, Agent, or Firm* — Bradshaw Law LLC

(57) ABSTRACT

A pipe with anti-degradation features used in industrial applications where pipelines carry a liquid with solid particles. The pipe having an abrasion resistant coating to protect the interior surface of the pipe. There being at least one band which is situated inside the pipe for particle collection. The particle collection path is used to collect solid waste that is commonly found mixed with the liquid waste.

14 Claims, 4 Drawing Sheets

PIPE FOR PIPELINE INFRASTRUCTURES

BACKGROUND

Industries use pipeline infrastructures for their operations every single day. These pipelines are commonly used for food, fuel, and manufacturing processes to name a few examples. They are used in liquid, drainage, and waste environments. The pipelines are often located inside large manufacturing facilities or underground and out of sight. Pipeline infrastructures are important to the regular and efficient operations of each and every industry where pipelines are found.

Flowing through these pipeline infrastructures are fluids, such as water, which carry with them solid particles. These solids, as they move through the pipes with the fluid, cause continuous abrasion on the inside surfaces of the pipelines. The movement of these solids through the pipes create effects that are undesirable to industry.

One example occurs in the steel manufacturing industry. Steel mills use pipelines to carry water away from hot blast furnaces and into water treatment centers. The water in these pipelines carries hard materials like slag, iron, and stone. Such hard materials traveling in pipelines cause abrasion, clogging, and pollutant discharge. Because of these ill effects, there is a recurring need for inspection, testing, and rehabilitation of damaged pipeline infrastructures. The need for this pipeline maintenance and repair increases as pipelines age and as they degrade from continued wear and tear.

Currently attempts to fix worn pipelines can involve trenching, removal, and replacement of pipes. There are attempts to attack the accumulation of solids by cleaning the inside of pipes using robots, but this does nothing for worn systems that occur due to years of particle abrasion. Recent pipeline repair solutions involve using sleeves, or slow hardening fiberglass wraps (cured in place pipes), at the site of a needed pipe repair. This effectively resurfaces the inside of a pipe but fails to address other problems with pipe degradation or pollution.

These attempts provide no long term solution for the abrasive effects of particles that travel pipelines along with the flowing fluids. Current attempts do not address the continued accumulation of particles inside the pipelines. These attempts do not allow for a planned collection and removal of the particles that collect in the pipelines. They also fail to address the need for controlling solid waste discharge from these pipelines to prevent land and water pollution.

There is a need in the industry for an apparatus that prevents the degradation of industrial pipelines, controls and simplifies the collection of solids discharged with industrial waste fluids, and prevents the environmental impact done by release of industrial solid waste. There is a need for such an apparatus that addresses failing pipeline infrastructures without the cost or disturbance of traditional replacement methods, similar to repairing pipes in place. A solution is needed that effectively ensures the integrity of pipes and increases the efficiency of pipeline systems without disrupting day-to-day industrial operations.

SUMMARY

The present invention is directed to a pipe that satisfies these need. A pipe having features of the present invention comprises a pipe. The pipe can be made of any suitable material, ideally corrosive resistant, used in industrial applications. Cast iron, PVC, fiberglass, or steel are a few examples of such suitable materials. The pipe having an interior surface along which the contents flow. A plurality of hard particles, I refer to these as shot and find that stainless steel balls work well. The hard particles I use are bead sized, but can be any size that is suitable for applying to a pipe's interior surface. The plurality of hard particles being adhesively attached to the interior surface. This can be done with an epoxy that allows the hard particles to adhere to the inside of the pipe and generally to one another. The plurality of hard particles forming a protective layer over the interior surface where attached, which occurs as a natural consequence of the adhering process.

There is at least one band. The at least one band having a joining surface, generally flat and smooth. The at least one band being shaped to generally conform to a contour of the interior surface. When viewed, the at least one band looks like a ring inside the pipe. There is at least one pull handle that is attached to the at least one band. The handle, after applying force, is used to cause the shape of the at least one band to be temporarily altered to effect placement of the at least one band within the pipe. The at least one band is installed in the inside of the pipe in this manner. The joining surface of the at least one band being securely attached to the interior surface, an epoxy can be used but I find that the tension of the at least one band exerts is enough to keep the at least one band in place and snugly fit against the interior surface. It is best to be sure there is no gap between the interior surface and the joining surface. The at least one band having a lip extending away from the interior surface.

I have found that multiple at least one bands work best to create a pathway for collecting solid waste. Best if they are situated 2.5 to 4 feet apart. However, one of these bands could be installed close to an initial discharge source when the remainder of the pipeline is generally flat or if an isolated section of existing pipeline requires replacement repeatedly due to abrasion wear. The geometry and other characteristics of the solid material will cause the material to accumulate angularly between the at least one bands. It is desirable to achieve this build up of solid material so as to further protect the interior surface from abrasion.

In another embodiment of the present invention, the hard particles have a hardness that is effective to protect the interior surface from abrasion caused by a solid material traveling through the pipe. This abrasive effect differs depending on whether a pipeline infrastructure is pressurized or not. So in my example of using stainless steel balls, they are hard enough to protect the pipe's interior surface from the abrasion of materials flowing through the pipe, such as iron, slag, stones, and the like to name a few examples. Additionally, the stainless steel balls will act to slow the solid material down so it is not flowing through the pipe as quickly as without the hard particles.

Another version of the present invention includes at least one band causing a solid material traveling through the pipe to accumulate. This happens when the solid material encounters and is essentially stopped from flowing by the lip of the at least one band.

Too there is a version of the present invention with an abrasion-resistant pipe system comprising a modified pipe having an inner surface and an overall length, the modified pipe including a coating of abrasion-resistant particles adhesively attached to a portion of the inner surface along at least a portion of the overall length. A flow-obstructing circular or semi-circular band affixed to the inner surface, the band positioned proximal to or within the coating of abrasion-resistant beads, the band having an outer joining surface that is configured to seat against the inner surface and a radial thickness greater than a thickness of the coating of abrasion-resistant particles, the band forming a flow obstacle in the pipe.

The coating can extend along the entire overall length, there is no limit intended, however this can vary for each installation. The flow-obstructing band is affixed to the inner surface via friction between the joining surface and the inner surface, I find that an epoxy can also be used in this joining. Too the flow-obstructing band can have an outer diameter greater than an inner diameter of the pipe, such that the flow-obstructed band can be affixed to the inner surface by compressing the flow-obstructing band then inserting the flow-obstructing band into the pipe and releasing the flow-obstructing band to expand against the inner surface. This is simplified by the flow-obstructing band having at least one pull handle connected to the flow-obstructing band wherein the flow-obstructing band is compressed by exerting force on the at least one pull handle.

As mentioned above, the coating could extend along just a portion of the overall length proximal to a flow inlet end of the pipe. Then the flow-obstructing circular band is positioned distal to the flow inlet end, and another after that and so on.

Notably, the radial thickness of the flow-obstructing band works best when measuring at approximately 1.5 inches. Also, the flow-obstructing band is one of what is best a plurality of flow-obstructing bands spaced apart along at least a portion of the overall length, again 2.5 to 4 feet apart. This plurality forms a series of flow obstacles along the at least a portion of the overall length of the pipe. The coating can further cover at least a portion of the plurality of flow-obstructing bands, wherein the abrasion-resistant particles are metallic and ideally corrosive resistant. For instance, stainless steel balls having a diameter between 0.5 millimeters and 1.0 millimeters.

One method embodiment of the present invention involves a method of preparing an abrasion-resistant pipe, the method comprising 1) providing a section of pipe having an overall length; 2) mixing a quantity of hard particles with an adhesive; 3) spraying the mixture of hard particles and adhesive onto an inner surface of the pipe along at least a portion of the overall length; 4) providing one or more flow-obstructing circular or semi-circular bands, the one or more bands having an outer joining surface configured to seat against the inner surface and a radial thickness greater than a thickness of the coating of abrasion resistant particles; and 5) forming one or more flow obstacles in the pipe by inserting the one or more flow-obstructing bands spaced apart along the at least a portion of the overall length so that the joining surface of the one or more flow-obstructing bands are affixed to the inner surface.

Important to the method embodiment, the one or more flow-obstructing bands are affixed to the inner surface via friction between the joining surface and the inner surface. The hard particles are stainless steel shot having diameters between 0.5 millimeters and 1.0 millimeters, and wherein the radial thickness of the flow-obstructing bands is 1.5 inches.

In another embodiment of the present invention, the pipe is useful in slowing the flow of solid material to prevent it from being discharged into the external land or water environments. The solid material is slowed by the hard material and collected between the bands. Maintenance on the pipe is made easier because the collected solids can be easily located and removed from the area around the lips.

BRIEF DESCRIPTION OF THE DRAWINGS

These and other features, aspects and advantages of the present invention will become better understood with regard to the following description, appended claims, and accompanying drawings where:

FIG. 2 shows a perspective view of another version of a pipe embodying features of the present invention for anti-degradation; and.

DESCRIPTION

Overview

Figure 1:
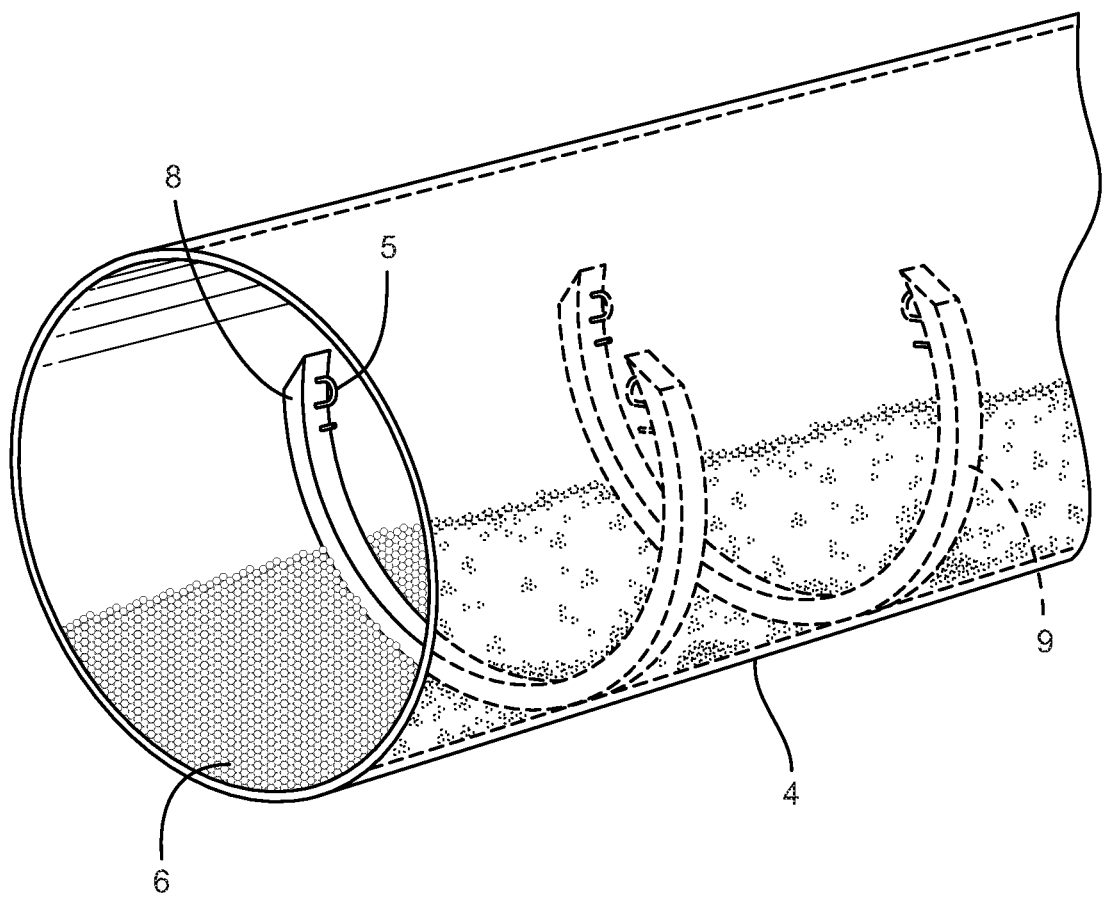
FIG. 1 shows a perspective view of a pipe embodying features of the present invention for anti-degradation.

As shown in FIG. 1, this embodiment of a pipe 4 shows a perspective of the present invention. Within the pipe 4 and adhered to a portion of the inner surface of the pipe 7 is a layer of shot 6, the shot being made from hard particles. In this version of my invention I prefer stainless steel balls for the layer of shot 6 that are mixed with epoxy and sprayed onto the inner surface 7. The layer of shot 6 extends up the sides and down the pipe 4 only so far as is needed to slow solid materials. This is easily calculated and dependent upon the slope of the pipe 4 installation and the speed with which solid material laden fluids flow through the pipe.

Also within the pipe 4 are shown two at least one bands 8. These at least one bands are made from steel, or other durable material, and have a certain amount of flexibility. They are attached to the interior, or inner, surface along a joining surface 9. A worker can position the at least one bands 8 inside the pipe 4 by grabbing onto the at least one pull handles 5 and manipulating the at least one bands 8 to fit where needed. The at least one bands 8 have a lip 10, essentially formed from the side of the at least one bands 8, that is useful for stopping solid materials (not shown) flowing through the pipe 4.

Figure 2:
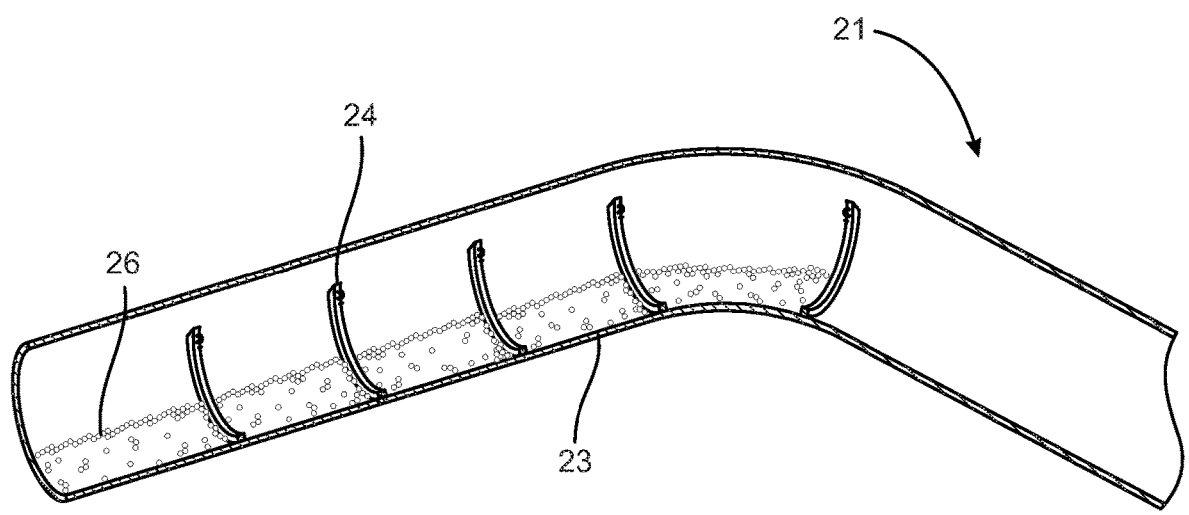

As shown in FIG. 2, another embodiment of a pipe 23 shows a perspective of the present invention with a cutaway view. The pipe 23 has shot, hard particles, applied in a layer 26 on a portion of the interior surface of the pipe. There are a plurality of at least one bands 24 positioned within the pipe 23 along the length of the pipe 23. This creates a pathway for collecting solid materials (not shown) that flow through the pipe 23 and also a protective layer, via the hard particles, which slow the material and prevent the material from abrading the pipe's interior surface. I have found that the hard particles 26 and bands 24 become less effective further along the pipe and are not used 21, though they could be used for an entire extent of a pipeline infrastructure.

I have found it preferable that the band be from 4" to 144" in diameter, but the size is suited to the pipe. Hard particles are best if measuring 0.5 MM to 1 MM depending on the diameter of the pipe, slope, elbows, and pipe length. However, any size hard particles can be used where the essential quality is to provide a hard surface layer that protects solid materials, flowing with the liquids through a pipe, from causing abrasion of the pipe's interior surfaces.

Figure 3:
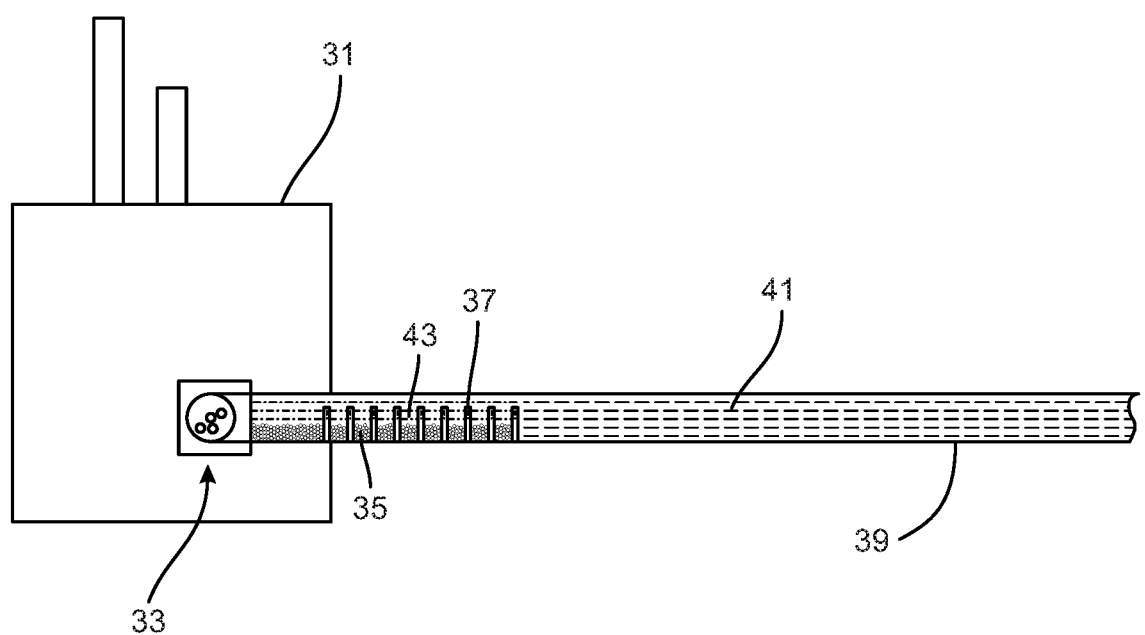
FIG. 3 shows an illustration of another embodiment of the present invention being used in a steel manufacturing process.

FIG. 3 shows another embodiment of the present invention. In this illustration, a steel mill's blast furnace 31 is shown. Such a blast furnace is known to use water to cool the hot metal in its towers. That water is drawn away from the furnace and deposited into a waste water treatment plant. Most industrial processes use what is referred to as contact water to transport debris from their processed goods. This illustrated version of the present invention has a pipe 39 attached to a blast furnace discharge that water with solid materials flowing 33. The water and solid materials flow down the pipe 39. Water and solid materials travel over the hard particles, the shot, 35 and continues on over the at least one bands 37. The solid materials collect in a space 43 between the at least one bands 37. Cleaner water 41 flows down the pipe 39.

Figure 4:
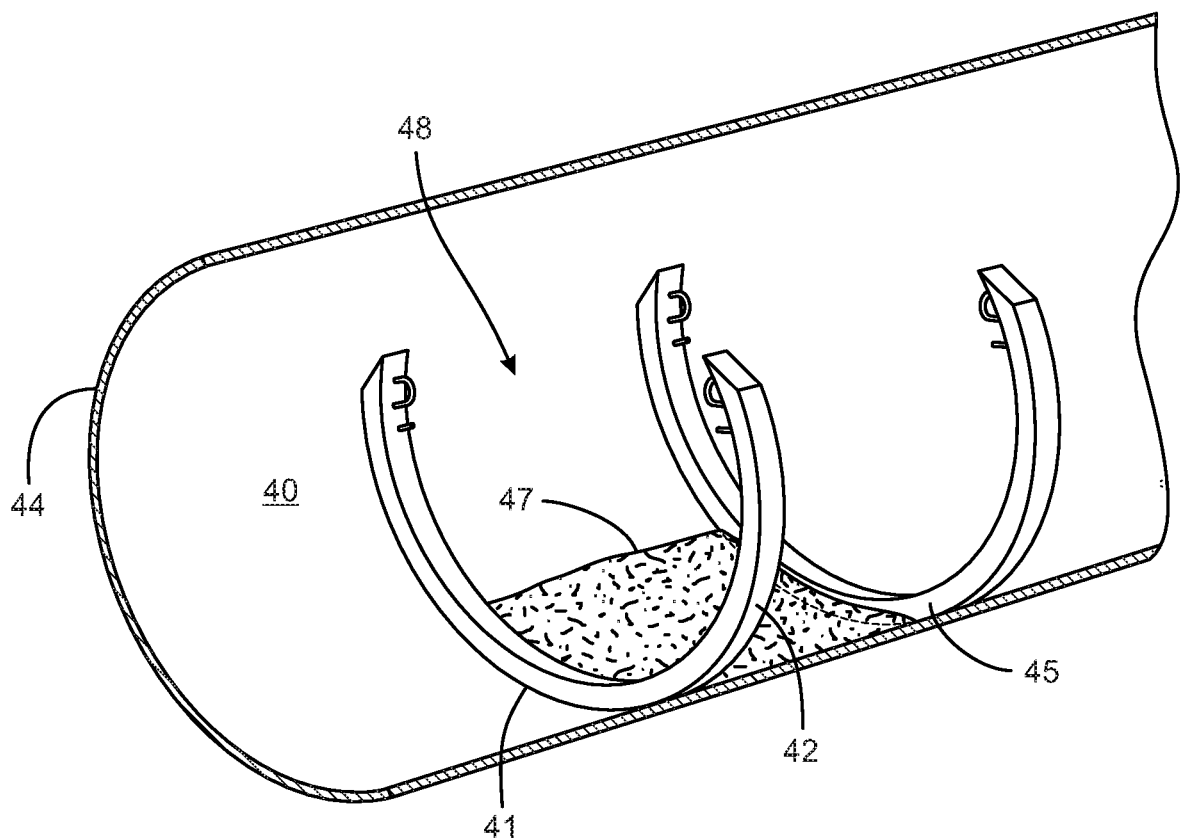
FIG. 4 shows a perspective view of a portion of another embodiment of the present invention.

FIG. 4 shows another embodiment of the present invention. In this illustration one aspect of a useful function of the present invention is shown for clarification. A pipe 44 has an interior surface 40. Though not shown, a hard particle layer precedes the at least one bands 41 and often that layer can also be made to cover the surface of the bands. The at least one bands 41 have a joining surface 42, which is essentially the underside of the at least one bands 41. That joining surface 42 is securely attached to the interior surface 40. This attachment occurs due to the torsion that the spring exerts against the interior surface 40. A user manipulates the at least one bands 41 by exerting force on at least one pull handles 49 that are fixedly attached to the at least one bands 41. Once in place the bands fit snugly in the pipe 44. More specifically, a user can compress the at least one band 41 to insert the band into the pipe 44 by exerting force on at least one pull handles 49 that are fixedly attached to the at least one bands 41. Once in place the compressed band expands to fit snugly in the pipe 44.

The at least one bands 41 have a lip 45. I have found the at least one bands to be best if made of 1.5" thickness, though any size can be used. Solid material 47 that flows with a liquid through the pipe 44 gets stopped by the lip 45 and collects in a space 48 between the at least one bands 41. It is this collection of solid materials 47 that allows for easy removal of these undesired materials, and also prevents the solid materials 47 from traveling further down the pipe 44 and being discharged into the environment.

Although the present invention has been described in considerable detail with the reference to certain preferred versions thereof, other versions are possible. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. § 112, ¶6.

What I claim is:

1. An abrasion-resistant pipe system for use with fluids carrying solid material, the pipe system comprising:
   a modified pipe having an inner surface and an overall length, the modified pipe including a coating of abrasion-resistant particles adhesively attached to a portion of the inner surface along at least a portion of the overall length; and
   a flow-obstructing circular or semi-circular band affixed to the inner surface, the band positioned proximal to or within the coating of abrasion-resistant particles, the band having an outer joining surface that is configured to seat against the inner surface and a radial thickness greater than a thickness of the coating of abrasion-resistant particles, the band forming a flow obstacle for solid material traveling in the pipe sufficient to cause the solid material to accumulate such that the resulting accumulation of solid material further protects the interior surface of the pipe from abrasion.

2. The pipe system of claim 1, wherein the coating extends along the entire overall length.

3. The pipe system of claim 1, wherein the flow-obstructing band is affixed to the inner surface via friction between the joining surface and the inner surface.

4. The pipe system of claim 1, wherein the flow-obstructing band has an outer diameter greater than an inner diameter of the pipe, wherein the flow-obstructing band is affixed to the inner surface by compressing the flow-obstructing band to insert the flow-obstructing band into the pipe and releasing the flow-obstructing band to expand against the inner surface.

5. The pipe system of claim 4, wherein the flow-obstructing band further includes at least one pull handle connected to the flow-obstructing band, and wherein the flow-obstructing band is compressed by exerting force on the at least one pull handle.

6. The pipe system of claim 1, wherein the coating extends along a portion of the overall length proximal to a flow inlet end of the pipe.

7. The pipe system of claim 6, wherein the flow-obstructing circular band is positioned distal to the flow inlet end.

8. The pipe system of claim 1, wherein the radial thickness of the flow-obstructing band is 1.5 inches.

9. The pipe system of claim 1, wherein the flow-obstructing band is one of a plurality of flow-obstructing bands spaced apart along at least a portion of the overall length.

10. The pipe system of claim 9, wherein the plurality forms a series of flow obstacles along the at least a portion of the overall length of the pipe.

11. The abrasion-resistant pipe system of claim 10, wherein the coating further covers at least a portion of the plurality of flow-obstructing bands.

12. The abrasion-resistant pipe system of claim 10, wherein the abrasion-resistant particles have a diameter between 0.5 millimeters and 1.0 millimeters.

13. The abrasion-resistant pipe system of claim 10, wherein the abrasion-resistant particles are metallic.

14. The abrasion-resistant pipe system of claim 13, wherein the metallic particles are stainless steel balls.

\* \* \* \* \*